US012597337B2

(12) United States Patent
Ganesan et al.

(10) Patent No.: US 12,597,337 B2
(45) Date of Patent: Apr. 7, 2026

(54) EVENT SENSING DEVICE

(71) Applicant: Honeywell International Inc.,
Charlotte, NC (US)

(72) Inventors: Kamal Raja Ganesan, Chennai (IN);
Barath Murugavel, Bangalore (IN);
Benjamin H. Wolf, Leicester (GB);
Michael Barson, Nuneaton (GB);
Sameer Tripathi, Bengaluru (IN)

(73) Assignee: Honeywell International Inc.,
Charlotte, NC (US)

( * ) Notice: Subject to any disclaimer, the term of this
patent is extended or adjusted under 35
U.S.C. 154(b) by 173 days.

(21) Appl. No.: 18/379,445

(22) Filed: Oct. 12, 2023

(65) Prior Publication Data

US 2025/0124781 A1 Apr. 17, 2025

(51) Int. Cl.
| | |
|---|---|
| *G08B 29/14* | (2006.01) |
| *G01N 15/06* | (2006.01) |
| *G01N 15/075* | (2024.01) |
| *G08B 17/107* | (2006.01) |

(52) U.S. Cl.
CPC ........... *G08B 29/145* (2013.01); *G01N 15/06*
(2013.01); *G01N 15/075* (2024.01); *G08B*
*17/107* (2013.01)

(58) Field of Classification Search
CPC .... G08B 29/145; G08B 17/107; G01N 15/06;
G01N 15/075
See application file for complete search history.

(56) References Cited

U.S. PATENT DOCUMENTS

| | | | | |
|---|---|---|---|---|
| 4,673,920 A | * | 6/1987 | Ferguson | G08B 27/001 |
| | | | | 340/508 |
| 4,702,412 A | * | 10/1987 | Zelczer | G05D 23/1925 |
| | | | | 165/238 |
| 4,726,285 A | * | 2/1988 | Kelley | F24F 13/068 |
| | | | | 454/297 |
| 4,848,654 A | * | 7/1989 | Zelczer | G05D 23/1925 |
| | | | | 165/212 |

(Continued)

FOREIGN PATENT DOCUMENTS

| | | |
|---|---|---|
| CN | 108335453 A | 7/2018 |
| CN | 109523760 A | 3/2019 |

(Continued)

OTHER PUBLICATIONS

Carter; "Cross-Zone Detection Options for Firesuppression Release";
ORR Protection, Jun. 10, 2021 (7 pgs) https://www.orrprotection.
com/mcfp/cross-zone-detection-options-for-fire-suppression-release.

(Continued)

*Primary Examiner* — Curtis J King
(74) *Attorney, Agent, or Firm* — Brooks, Cameron &
Huebsch, PLLC

(57) ABSTRACT

Devices, methods, and systems for an event sensing device
are described herein. One device includes a variable airflow
device and a controller configured to activate the variable
airflow device to increase airflow into the event sensing
device responsive to the event sensing device or a neigh-
boring event sensing device detecting an unconfirmed fire,
detect whether a fire is occurring using the increased airflow
responsive to activating the variable airflow device, and
report a confirmed fire responsive to detecting a fire occur-
ring.

20 Claims, 5 Drawing Sheets

(56) References Cited

U.S. PATENT DOCUMENTS

| | | | | |
|---|---|---|---|---|
| 5,309,146 | A * | 5/1994 | Kenet | G08B 13/19 |
| | | | | 340/567 |
| 5,555,876 | A * | 9/1996 | Francisco, Jr. | F23N 3/042 |
| | | | | 236/1 G |
| 5,718,627 | A * | 2/1998 | Wicks | F24F 11/0001 |
| | | | | 454/251 |
| 6,237,630 | B1 * | 5/2001 | Stone | F16K 51/02 |
| | | | | 137/601.12 |
| 7,030,766 | B2 * | 4/2006 | Right | F24F 11/49 |
| | | | | 340/630 |
| 7,286,050 | B2 | 10/2007 | Faltesek | |
| 7,609,952 | B2 | 10/2009 | Jezierski et al. | |
| 8,547,238 | B2 | 10/2013 | Harchanko | |
| 11,024,154 | B1 * | 6/2021 | Lang | G08B 29/24 |
| 11,127,284 | B1 * | 9/2021 | Barson | G08B 17/107 |
| 11,545,014 | B1 * | 1/2023 | Tignor | G01J 5/10 |
| 2004/0135695 | A1 * | 7/2004 | Barton | G08B 25/002 |
| | | | | 340/628 |
| 2005/0102061 | A1 * | 5/2005 | Lent | C22B 11/00 |
| | | | | 700/245 |
| 2009/0321039 | A1 * | 12/2009 | Therrien | H05K 7/2059 |
| | | | | 700/275 |
| 2015/0011169 | A1 | 1/2015 | Kates | |
| 2015/0096351 | A1 * | 4/2015 | Orsini | G01N 21/53 |
| | | | | 73/28.01 |
| 2015/0273257 | A1 * | 10/2015 | Nikkarila | A62C 35/58 |
| | | | | 169/46 |
| 2017/0061757 | A1 * | 3/2017 | Zribi | G08B 17/10 |
| 2018/0229060 | A1 * | 8/2018 | Huotari | A62C 3/006 |
| 2019/0336800 | A1 * | 11/2019 | Tignor | F24F 11/34 |
| 2019/0391573 | A1 * | 12/2019 | Wang | G05B 23/0254 |
| 2020/0110374 | A1 * | 4/2020 | Piaskowski | G05F 1/66 |
| 2020/0141608 | A1 * | 5/2020 | Sinha | F24F 11/65 |
| 2020/0393152 | A1 * | 12/2020 | Ramirez | F24F 1/42 |
| 2020/0408428 | A1 * | 12/2020 | Smith | F24F 13/1406 |
| 2021/0065536 | A1 * | 3/2021 | Dearden | G08B 17/10 |
| 2021/0350684 | A1 * | 11/2021 | Nagashima | G08B 29/188 |
| 2022/0058929 | A1 * | 2/2022 | Dearden | G01N 15/06 |
| 2022/0076552 | A1 * | 3/2022 | Kim | G06F 18/22 |
| 2022/0401776 | A1 * | 12/2022 | Munuera Garcia | G01N 1/26 |
| 2023/0092341 | A1 * | 3/2023 | Josserand | F24F 11/58 |
| 2023/0173125 | A1 * | 6/2023 | Slotkin | A61L 2/26 |
| | | | | 422/24 |
| 2024/0131563 | A1 * | 4/2024 | Wu | B08B 17/02 |
| 2024/0139568 | A1 * | 5/2024 | Grayson | A62C 37/04 |
| 2024/0198153 | A1 * | 6/2024 | Porterfield | H01M 10/613 |
| 2024/0204271 | A1 * | 6/2024 | Porterfield | G01N 33/0078 |
| 2025/0012698 | A1 * | 1/2025 | Hsieh | G08B 17/10 |

FOREIGN PATENT DOCUMENTS

| | | |
|---|---|---|
| CN | 111311869 A | 6/2020 |
| EP | 2320397 A1 | 5/2011 |
| KR | 102289216 B1 | 8/2021 |
| WO | 2018194264 A1 | 10/2018 |

OTHER PUBLICATIONS

Sharma, et al., "A Critical Review on the Application & Problems Caused by False Alarms"; Intelligent Communication, Control and Devices. Advances in Intelligent Systems and Computing, vol. 624. (Apr. 11, 2018) (11 pgs) https://doi.org/10.1007/978-981-10-5903-2_38.

Rehman, et al., "Trustworthy Intelligent Industrial Monitoring Architecture for Early Event Detection by Exploiting Social IoT"; SAC '20: Proceedings of the 35th Annual ACM Symposium on Applied Computing (Mar. 30, 2020) (8 pgs) https://doi.org/10.1145/3341105.3373996.

* cited by examiner

340 — DEVICE DETECTS PRE-ALARM

342 — SYSTEM ACTIVATES VARIABLE AIRFLOW DEVICE

344 — EVENT DETECTED

YES          NO

346 — SYSTEM NORMAL

348 — NEIGHBORING VARIABLE AIRFLOW DEVICE ACTIVATED

350 — FIRE DETECTED BY NEIGHBORING DEVICE

YES          NO

352 — CONFIRMED FIRE

358 — FALSE ALARM

354 — ACTIVATE EVENT SYSTEM LOGIC AS IT IS REAL FIRE

360 — EVENT SYSTEM LOGIC IS NOT ACTIVATED AS IT IS A FALSE ALARM

356 — NECESSARY ACTIONS TAKEN

EVENT SENSING DEVICE

TECHNICAL FIELD

The present disclosure relates generally to devices, methods, and systems for sensing an event.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular cleaning and testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

Testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fire sensing devices, particularly at a large site. Additionally, it is often the case that many fire sensing devices never get tested because of access issues.

Over time a fire sensing device can become dirty with dust and debris. A clogged fire sensing device can prevent air and/or particles from passing through the fire sensing device to sensors in the fire sensing device, which can prevent a fire sensing device from detecting smoke, fire, and/or carbon monoxide.

In some instances, a fire sensing device can mistake dust for smoke and trigger a false alarm. False alarms can decrease trust in the fire alarm system and minimize actions taken in the event of a real fire because people are accustomed to the fire sensing device raising false alarms. False alarms can put undue burden on maintenance engineers who must check triggered fire sensing devices. Also, equipment (e.g., manlifts) used by the maintenance engineers to check triggered fire sensing devices may succumb to unnecessary wear due to false alarms.

DETAILED DESCRIPTION

Figure 1:
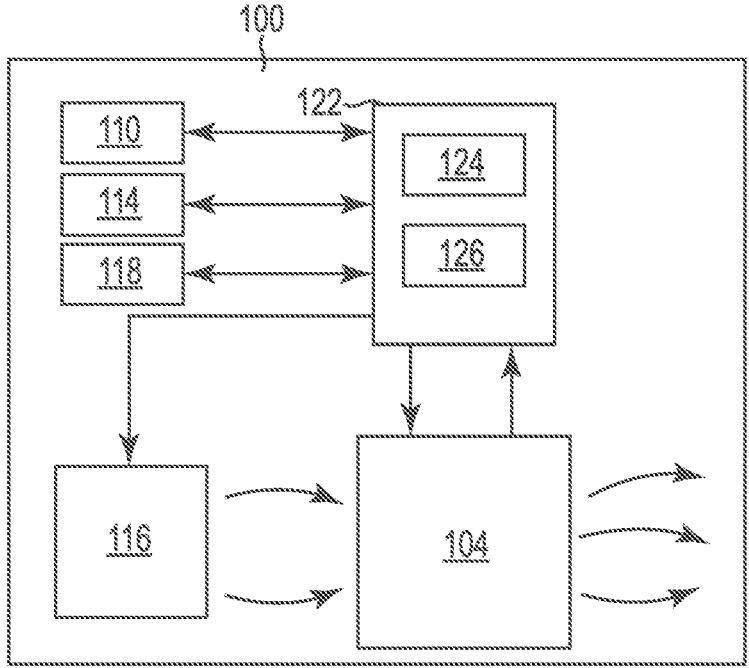
FIG. 1 illustrates a block diagram of a dual smoke detection function of an event sensing device in accordance with an embodiment of the present disclosure.

Devices, methods, and systems for an event sensing device are described herein. An event sensing device can be, but is not limited to, a fire sensing device. One event sensing device includes a variable airflow device and a controller. The controller can be configured to activate the variable airflow device to increase airflow into the event sensing device responsive to the event sensing device or a neighboring event sensing device detecting an unconfirmed fire, detect whether a fire is occurring using the increased airflow responsive to activating the variable airflow device, and report a confirmed fire responsive to detecting a fire is occurring.

In contrast to previous event sensing devices in which a person (e.g., maintenance engineer and/or operator) would have to manually verify a fire detected by an event sensing device, event sensing devices in accordance with the present disclosure can utilize a variable airflow device of the event sensing device to draw in the environment (e.g., gas and/or particles) quicker to confirm a fire and/or a variable airflow device of a neighboring event sensing device to draw in the environment quicker to confirm a fire. For example, by increasing the airflow, a number of air samples taken into the event sensing device and/or the neighboring event sensing device can be increased so that an event, for example, a fire may be detected faster.

The neighboring event sensing device can be an event sensing device closest to the event sensing device that detected the unconfirmed fire and/or an event sensing device in the same zone as the event sensing device that detected the unconfirmed fire. A zone can be a room, a floor, and/or an area, for example. The event sensing device and/or the neighboring event sensing device can utilize a variable airflow device, such as a fan, within the event sensing device and/or the neighboring event sensing device to increase airflow into the event sensing device and/or the neighboring event sensing device and detect whether a fire is occurring using the increased airflow responsive to activating the variable airflow device within the event sensing device and/or the neighboring event sensing device. Accordingly, event sensing devices in accordance with the present disclosure may confirm a fire without manual verification by a person if the event sensing device detects the fire again and/or the neighboring event sensing device also detects the fire.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

As used herein, "a", "an", or "a number of" something can refer to one or more such things, while "a plurality of" something can refer to more than one such things. For example, "a number of event sensing devices" can refer to one or more event sensing devices, while "a plurality of event sensing devices" can refer to more than one event sensing device.

FIG. 1 illustrates a block diagram of an event sensing device 100 in accordance with an embodiment of the present disclosure. The event sensing device 100 includes a controller (e.g., microcontroller) 122, a heat sensor 110, a gas sensor 114, a sounder 118, an optical scatter chamber 104, and/or a variable airflow device 116.

An event sensing device 100 can sense an event occurring and activate event response logic. For example, event sensing device 100 can sense a fire occurring in a facility and trigger event response logic, which can include a fire response to provide a notification of the fire to occupants of the facility. Event response logic can trigger visual and/or audio alarms from the sounder 118, for example. Although the sounder 118 is illustrated as included in the event sensing device 100 in FIG. 1, the sounder 118 can be located outside of the event sensing device 100 and can be wired or wirelessly coupled to the event sensing device 100. Event response logic can also notify emergency services (e.g., fire departments, police departments, etc.) In some examples, a plurality of event sensing devices can be located throughout a facility (e.g., on different floors and/or in different rooms of the facility).

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to confirm a fire in accordance with the present disclosure. For instance, processor 126 can execute the executable instructions stored in memory 124 to activate the variable airflow device 116 to increase airflow into the event sensing device 100 responsive to a neighboring event sensing device detecting an unconfirmed fire or responsive to the event sensing device 100 detecting an unconfirmed fire, detect whether a fire is occurring using the increased airflow responsive to activating the variable airflow device, and report a confirmed fire responsive to detecting a fire is occurring. The event sensing device 100 and the neighboring event sensing device can be located in the same room.

The controller 122 can detect whether an unconfirmed fire or a fire is occurring by measuring a quantity of particles in the optical scatter chamber 104 and comparing the quantity of particles to a baseline quantity. For example, an unconfirmed fire can be triggered responsive to a quantity of particles, gas level, and/or temperature reaching or exceeding a particular threshold (e.g., a pre-alarm) or any quantity of particles, gas level, and/or temperature above the baseline. The unconfirmed fire can trigger an increase in airflow to draw in the external environment faster to more quickly determine whether a fire is actually occurring.

In some examples, the controller 122 can report a false alarm responsive to detecting a fire is not occurring. The controller 122 can determine a fire is not occurring responsive to the quantity of particles, the gas level, and/or temperature being less than or equal to the baseline, for example.

Figure 2:
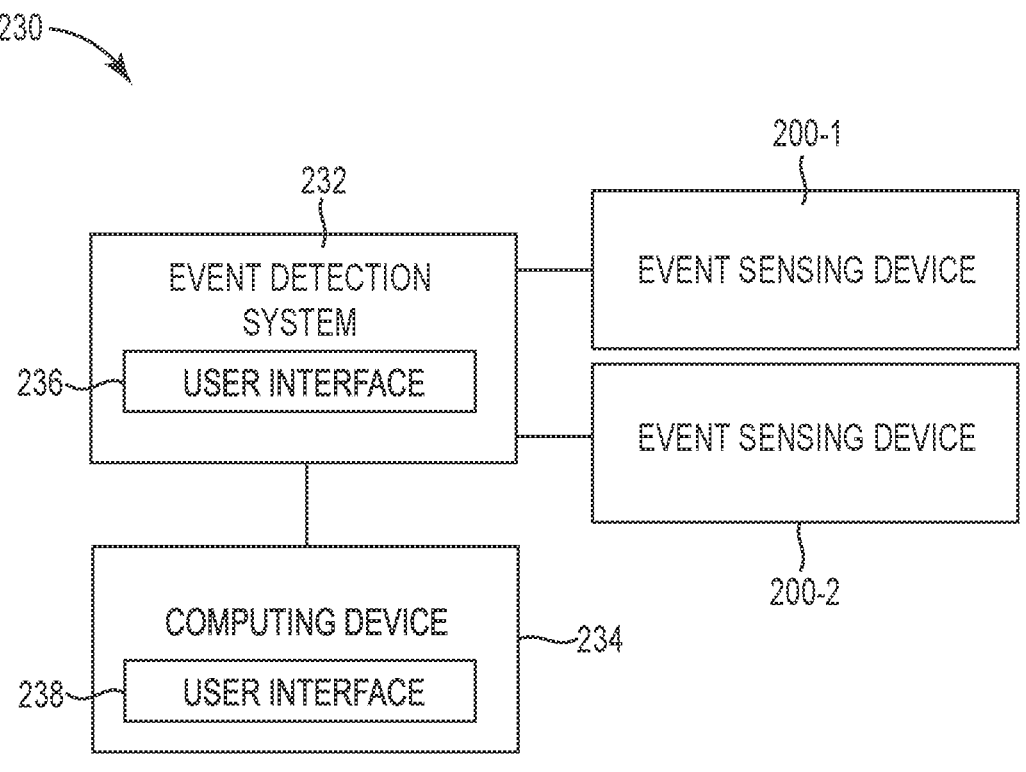
FIG. 2 illustrates a block diagram of an event system in accordance with an embodiment of the present disclosure.

In a number of embodiments, the event sensing device 100 can receive a command from an event detection system (e.g., event detection system 232 in FIG. 2). The event detection system can be, but is not limited to, a fire alarm control panel. The event sensing device 100 can activate the variable airflow device 116 responsive to the command. In some examples, the variable airflow device 116 can be a fan. The confirmed fire can be reported by the controller 122 to the event detection system. The controller 122 can activate the sounder 118 responsive to detecting a fire is occurring.

The memory 124 can store the baseline quantity and/or the event response logic. In some examples, a previously measured quantity can be stored in memory 124 as the baseline quantity if, for example, the previously measured quantity is the first (e.g., initial) measured quantity in the event sensing device 100.

The variable airflow device 116 can control the airflow through the event sensing device 100, including the optical scatter chamber 104. For example, the variable airflow device 116 can move particles, gases, and/or aerosol from a first end of the event sensing device 100 to a second end of the event sensing device 100. The variable airflow device 116 can start responsive to a command and can stop responsive to a command and/or after a particular period of time.

In a number of embodiments, the controller 122 can detect whether a fire is occurring by measuring a gas level in the event sensing device 100 using the gas sensor 114 and comparing the gas level to a baseline gas level and/or measuring a temperature in the event sensing device 100 using the heat sensor 110 and comparing the temperature to a baseline temperature. In a number of embodiments, the gas level and/or temperature can be measured subsequent to activating the variable airflow device 116.

The controller 122 can report an unconfirmed fire and/or a confirmed fire responsive to the gas level being greater than the baseline gas level and/or the temperature being greater than the baseline temperature. For example, the controller 122 can trigger the variable airflow device 116 responsive to an unconfirmed fire and/or activate the event response logic responsive to a confirmed fire.

In a number of embodiments, the controller 122 can report a false alarm responsive to detecting a fire is not occurring. The controller 122 can determine a fire is not occurring responsive to the gas level being less than or equal to the baseline gas level and/or the temperature being less than or equal to the baseline temperature, for example. Responsive to determining a fire is not occurring the controller 122 can designate the unconfirmed fire as a false alarm and return the event sensing device 100 to a normal state.

The memory 124 can store the baseline gas level and/or the baseline temperature. In some examples, a previously measured gas level and/or temperature can be stored in memory 124 as the baseline gas level and/or baseline temperature if, for example, the previously measured gas level and/or temperature is the first (e.g., initial) measured gas level and/or temperature in the event sensing device 100.

FIG. 2 illustrates a block diagram of an event system 230 in accordance with an embodiment of the present disclosure. The event system 230 can include event sensing device 200-1, event sensing device 200-2, an event detection system 232, and a computing device 234. Event sensing device 200-1 and/or event sensing device 200-2 can be, for example, event sensing device 100 previously described in connection with FIG. 1.

Event sensing device 200-1 can measure a quantity of particles, a gas level, and/or a temperature in the event sensing device 200-1. A report of an unconfirmed fire based on the quantity of particles, the gas level, and/or the temperature can be transmitted from event sensing device 200-1 to the event detection system 232.

The event detection system 232 can be a fire control panel, a monitoring device, a fire detection control system, and/or a cloud computing device of the event system 230. The event detection system 232 can be configured to send commands to and/or receive reports from event sensing device 200-1 and/or event sensing device 200-2 via a wired or wireless network. For example, the event detection system 232 can receive a report of an unconfirmed fire from event sensing device 200-1, transmit a command to event sensing device 200-1 and/or event sensing device 200-2 to activate a variable airflow device (e.g., variable airflow device 116 in FIG. 1) of event sensing device 200-1 and/or event sensing device 200-2 responsive to receiving the report of the unconfirmed fire, and indicate event sensing device 200-1 and/or event sensing device 200-2 is active on user interface 236 responsive to transmitting the command to event sensing device 200-1 and/or event sensing device 200-2.

In some examples, event sensing device 200-1 can activate a variable airflow device of event sensing device 200-1 responsive to the unconfirmed fire and/or smoldering smoke entering event sensing device 200-1. Event sensing device 200-1 can further measure a quantity of particles in the optical scatter chamber of event sensing device 200-1, measure a gas level in the event sensing device 200-1, and/or measure a temperature in the event sensing device 200-1 subsequent to activating the variable airflow device of event sensing device 200-1. Event sensing device 200-1 can compare the quantity of particles measured by event sensing device 200-1 to a baseline quantity, the gas level measured by event sensing device 200-1 to a baseline gas level, and/or the temperature measured by event sensing device 200-1 to a baseline temperature and transmit a report of a confirmed fire responsive to the quantity of particles being greater than the baseline quantity, the gas level being greater than the baseline gas level, and/or the temperature being greater than the baseline temperature.

Event sensing device 200-2 can be a neighboring device of event sensing device 200-1 and can measure a quantity of particles in an optical scatter chamber of event sensing device 200-2, measure a gas level in the event sensing device 200-2, and/or measure a temperature in the event sensing device 200-2 subsequent to activating the variable airflow device of event sensing device 200-2 responsive to receiving the command. Event sensing device 200-2 can compare the quantity of particles measured by event sensing device 200-2 to a baseline quantity, the gas level measured by event sensing device 200-2 to a baseline gas level, and/or the temperature measured by event sensing device 200-2 to a baseline temperature and transmit a report of a confirmed fire responsive to the quantity of particles being greater than the baseline quantity, the gas level being greater than the baseline gas level, and/or the temperature being greater than the baseline temperature.

In a number of embodiments, the event detection system 232 can receive a report from event sensing device 200-1 and/or event sensing device 200-2 after transmitting the command to event sensing device 200-1 and/or event sensing device 200-2. In some examples, the report from event sensing device 200-1 and/or event sensing device 200-2 can confirm the unconfirmed fire or can designate the unconfirmed fire as a false alarm. The event detection system 232 can activate an event response logic responsive to the report confirming the unconfirmed fire. The event detection system 232 can designate the unconfirmed fire as a false alarm and/or return the event detection system 232 to a normal state responsive to the report designating the unconfirmed fire as a false alarm.

The event detection system 232 can receive reports from a number of event sensing devices analogous to event sensing device 200-1 and event sensing device 200-2. For example, the event detection system 232 can receive reports from each of a number of event sensing devices analogous to event sensing device 200-1 and event sensing device 200-2 and transmit commands based on the reports from each of the number of event sensing devices.

The user interface 236 can be a GUI that can provide and/or receive information to and/or from a user, event sensing device 200-1, and/or event sensing device 200-2. The user interface 236 can display messages and/or data received from event sensing device 200-1 and/or event sensing device 200-2. For example, the user interface 236 can alert a user to an unconfirmed fire, a confirmed fire, and/or a false alarm reported by event sensing device 200-1 and/or event sensing device 200-2.

The networks described herein can be a network relationship through which event sensing device 200-1, event sensing device 200-2, and/or event detection system 232 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to event sensing device 200-1, event sensing device 200-2, and/or event detection system 232 via a wired or wireless network.

As used herein, a "network" can provide a communication system that directly or indirectly links two or more computers and/or peripheral devices and allows, for example, an event detection system 232 to access data and/or resources on event sensing device 200-1 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

In some examples, the network can be used by event sensing device 200-1, event sensing device 200-2, and/or the event detection system 232 to communicate with a computing device 234. The computing device 234 can be a personal laptop computer, a desktop computer, a mobile device such as a smart phone, a tablet, a wrist-worn device, and/or redundant combinations thereof, among other types of computing devices. The computing device 234 can receive reports including reports of a confirmed fire from a number of event sensing devices analogous to event sensing device 200-1 and/or event sensing device 200-2 and/or a number of event detection systems analogous to event detection system 232 and transmit commands based on the reports to one or more of the number of event sensing devices and/or one or more of the number of event detection systems.

The computing device 234 can include a user interface 238. The user interface 238 can be a GUI that can provide and/or receive information to and/or from a user, event sensing device 200-1, event sensing device 200-2, and/or event detection system 232. The user interface 238 can display messages and/or data received from event sensing device 200-1, event sensing device 200-2, and/or event detection system 232. For example, the user interface 238 can alert a user to an unconfirmed fire, a confirmed fire, and/or a false alarm reported by event sensing device 200-1 and/or event sensing device 200-2.

Figure 3:
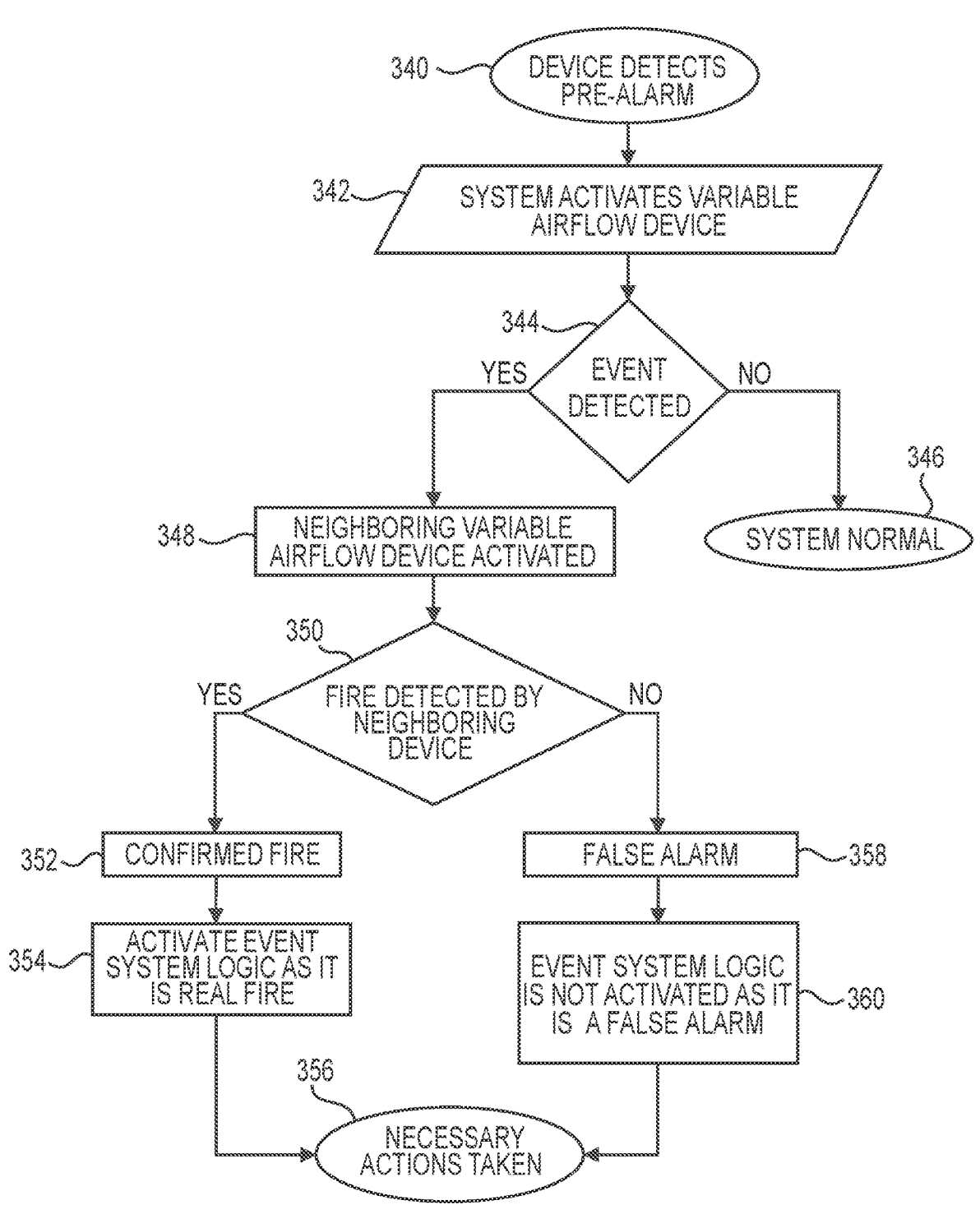
FIG. 3 is a flow chart associated with confirming a fire using a neighboring event sensing device in accordance with an embodiment of the present disclosure.

FIG. 3 is a flow chart associated with confirming a fire using an event sensing device in accordance with an embodiment of the present disclosure. In some embodiments, the steps of the flow chart illustrated in FIG. 3 can be performed by the event sensing device, previously described in connection with FIGS. 1 and/or 2. At 340, the event sensing device can detect a pre-alarm. The pre-alarm can be triggered by the event sensing device detecting dust, an insect, and/or smoke as particles. For example, an optical scatter chamber (e.g., optical scatter chamber 104 of FIG. 1) can be configured to measure a quantity of particles inside the optical scatter chamber of the event sensing device. In a number of embodiments, the optical scatter chamber can include a transmitter light-emitting diode (LED) and a receiver photodiode to measure the quantity of particles within the optical scatter chamber.

The event sensing device can report a pre-alarm to the event detection system (e.g., event detection system 232 of FIG. 2) at 340. The event sensing device can report the pre-alarm responsive to the quantity of particles being greater than zero and/or greater than a baseline quantity. The pre-alarm can be displayed as a pre-alarm on a user interface (e.g., user interface 236 of FIG. 2) of the event detection system.

At 342, the event detection system can transmit a command to activate a variable airflow device (e.g., variable airflow device 116 of FIG. 1) within the event sensing device. The event detection system can transmit the command to the event sensing device responsive to receiving the report of the pre-alarm from the event sensing device.

The event sensing device can activate the variable airflow device to remove the dust, insect, and/or smoke in the optical scatter chamber at 342. The variable airflow device can activate for a particular period of time responsive to receiving the command. In a number of embodiments, the event sensing device can reset internally. Resetting the event sensing device allows the event sensing device to detect particles again.

The event sensing device can determine an event was detected at 344 by, for example, detecting particles again responsive to resetting the event sensing device. The optical scatter chamber can continuously or periodically measure the quantity of particles inside the event sensing device and determine whether an event is detected at 344 and whether to trigger an alarm based on the measured quantity of particles inside the event sensing device.

At 346, the event sensing device can determine the system is normal. For example, the quantity of particles measured inside the event sensing device can be zero or below a baseline quantity at 346. After increasing the airflow to bring in additional air samples, if the optical scatter chamber does not detect particles, the event sensing device can determine there is no smoke at 346 and determine the event was a false alarm.

At 346, a false alarm can be eliminated and an event system (e.g., event system 230 of FIG. 2) can be set to normal. For example, the event sensing device can report a false alarm responsive to a quantity of particles measured responsive to activating the variable airflow device being less than or equal to a previously measured quantity of particles. In a number of embodiments, the user interface of the event detection system can alert a user to the false alarm reported by the event sensing device.

At 344, the event sensing device can determine if an event is detected. For example, after increasing the airflow to bring in additional air samples, the event sensing device can trigger a fire alarm if the smoke continues to enter the optical scatter chamber.

The fire alarm can include reporting a confirmed fire responsive to a quantity of particles measured responsive to activating the variable airflow device being greater than a baseline quantity. A user interface of the event detection system can alert a user to the confirmed fire reported by the event sensing device.

The neighboring event sensing device can activate a variable airflow device at 348. In some examples, the neighboring event sensing device can activate the variable airflow device responsive to a command from the event detection system. The variable airflow device can activate for a particular period of time responsive to receiving the command.

At 350, the neighboring event sensing device can determine whether a fire is detected by measuring a quantity of particles in an optical scatter chamber and comparing the quantity of particles to a baseline quantity. The neighboring event sensing device can confirm the fire at 352 responsive to the quantity of particles being greater than the baseline quantity or report a false alarm responsive to the quantity of particles being less than or equal to the baseline quantity at 358.

At 354, event system logic can be activated in response to the neighboring event sensing device confirming the fire. In a number of embodiments, a sounder (e.g., sounder 118 of FIG. 1) can be activated. For example, the sounder can be activated responsive to the quantity of particles being greater than a baseline quantity. The sounder can be included in or separate from the event sensing device. In some examples, the sounder can be one of a number of output devices activated in response to the neighboring event sensing device detecting smoke. Other output devices can include a relay to an air vent, a door closer, or a relay to an elevator, for example.

An output device can be activated by a command from the event detection system and/or the event sensing device. In a number of embodiments, the event detection system can transmit a command to an output device to perform an output event responsive to receiving the report of the confirmed fire. The output device can perform the output event responsive to receiving the command from the event detection system and/or transmit a notification that the output device performed the output event to the event detection system responsive to performing the output event.

At 360, the event system logic is not activated as it is a false alarm. In a number of embodiments, the sounder is not activated. At 356, necessary actions can be taken. For example, the neighboring event sensing device can transmit a report of a false alarm responsive to the quantity of particles being less than or equal to the baseline quantity or people can be evacuated responsive to a sounder and/or other output devices being activated in the case of a real fire.

Figure 4:
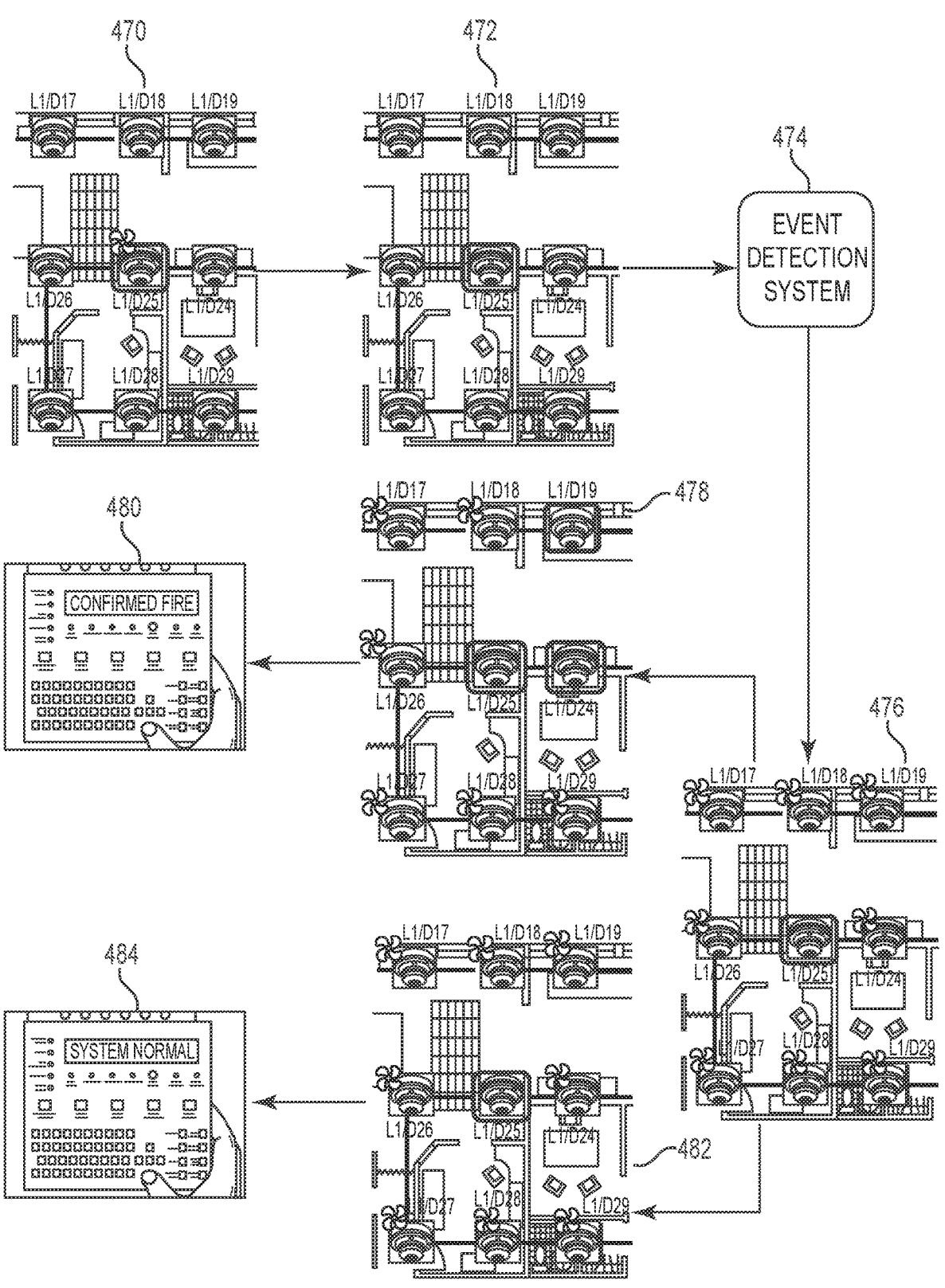
FIG. 4 is a flow diagram associated with confirming a fire using a neighboring event sensing device in accordance with an embodiment of the present disclosure.

FIG. 4 is a flow diagram associated with confirming a fire using a neighboring event sensing device in accordance with an embodiment of the present disclosure. In some embodiments, the steps of the flow diagram illustrated in FIG. 4 can be performed by the event sensing device, previously described in connection with FIGS. 1 and/or 2. At 470, an event sensing device, "L1/D25" can be in a pre-alarm state. The variable airflow device (e.g., variable airflow device 116 in FIG. 1) of the event sensing device can be activated responsive to being in the pre-alarm state.

At 472, an unconfirmed fire alarm can be triggered at the event sensing device. The unconfirmed alarm can be reported to the event detection system (e.g., event detection system 232 in FIG. 2).

At 474, the event detection system can transmit a command responsive to receiving the report of the unconfirmed fire. The command can be transmitted to a neighboring event sensing device of the event sensing device that reported the unconfirmed fire.

At 476, the neighboring event sensing devices can activate their variable airflow devices to increase a number of air samples taken into the neighboring event sensing devices to detect an unconfirmed fire.

One or more neighboring devices can detect a fire at 478. For example event sensing device "L1/D19" and event sensing device L1/D24" can detect a fire. The one or more neighboring devices can transmit a report to the event detection system responsive to detecting the fire.

At 480, the event detection system can convey a confirmed fire since one or more of the neighboring devices detected a fire. The confirmed fire can be conveyed via a user interface (e.g., user interface 236 in FIG. 2)

As illustrated in FIG. 4, none of the neighboring devices detect a fire at 482. At 484, the event detection system can convey the event system is normal since none of the neighboring devices detected a fire.

FIGS. 5A-5D are illustrations of a display provided on a user interface 538 of a computing device 534 in accordance with an embodiment of the present disclosure. The user interface 538 can show an application for reporting a state of a number of event sensing devices. The application can be software/firmware included on an operating system of the computing device 534 and/or downloaded and/or installed on the computing device 534. In some examples, the application illustrated in FIGS. 5A-5D can be displayed on the user interface 538 responsive to receiving a selection to open the application via the user interface 538.

Figures 5A, 5B, 5C, 5D:
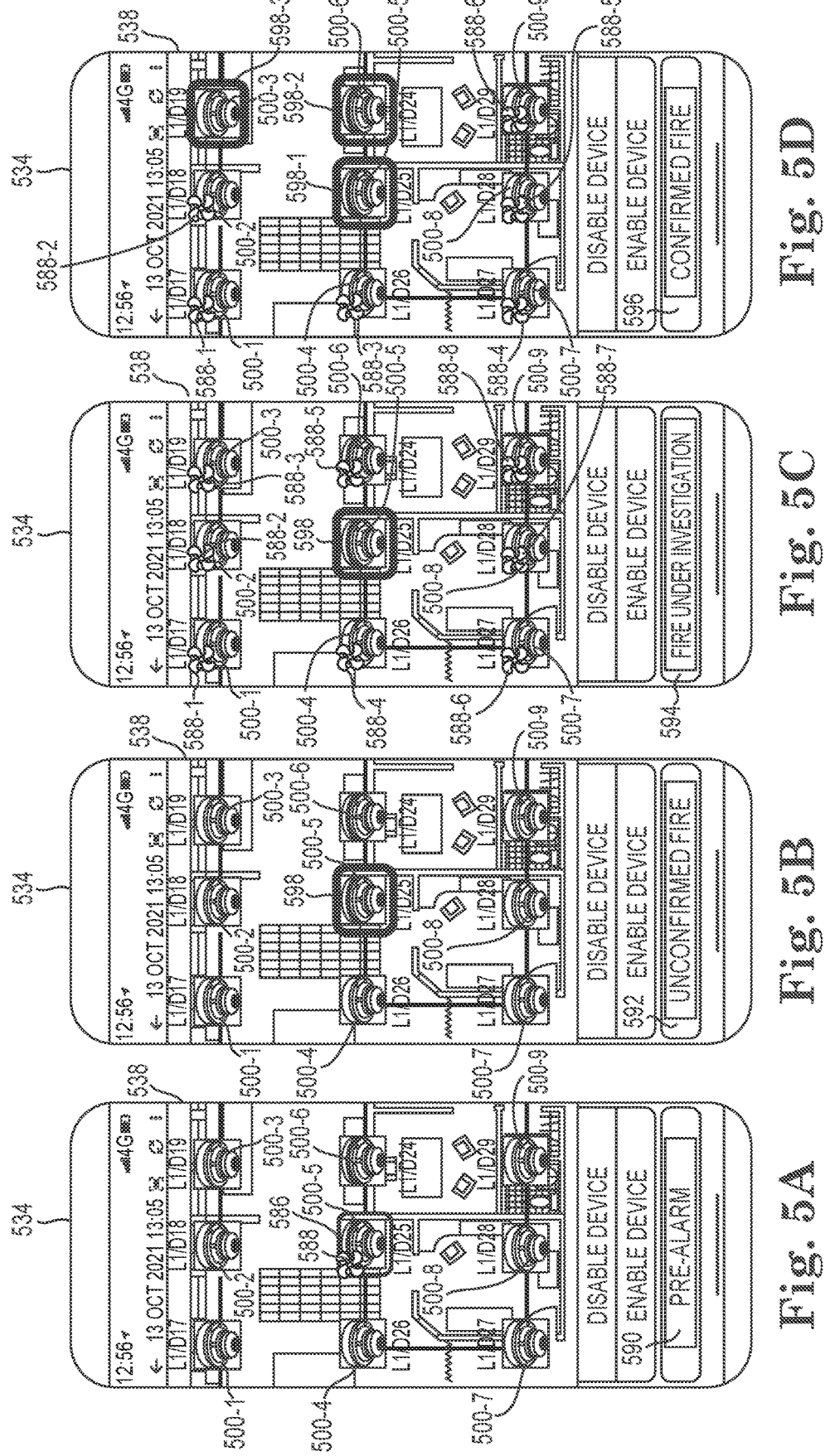
FIG. 5A is an illustration of a display provided on a user interface of a computing device in accordance with an embodiment of the present disclosure.
FIG. 5B is an illustration of a display provided on a user interface of a computing device in accordance with an embodiment of the present disclosure.
FIG. 5C is an illustration of a display provided on a user interface of a computing device in accordance with an embodiment of the present disclosure.
FIG. 5D is an illustration of a display provided on a user interface of a computing device in accordance with an embodiment of the present disclosure.

As illustrated in FIG. 5A, the user interface 538 can present data representing a number of event sensing devices 500-1, 500-2, 500-3, 500-4, 500-5, 500-6, 500-7, 500-8, 500-9, which can correspond to event sensing device 100 and/or 200 of FIGS. 1 and 2, respectively. A user can be notified of a pre-alarm by icon 586 associated with a particular event sensing device 500-5. Icon 590 can further convey that event sensing device 500-5 is in a pre-alarm state. Icon 588 can indicate that a variable airflow device of event sensing device 500-5 is currently activated.

The user interface 538 illustrated in FIG. 5B can notify a user of a report of a fire via icon 598 at event sensing device 500-5. Icon 592 can further convey that the event sensing device 500-5 is in an unconfirmed fire state.

As illustrated in FIG. 5C, the user interface 538 can notify a user of a fire under investigation via icon 594. Icon 598 can continue showing a report of a fire at event sensing device 500-5. Icons 588-1, 588-2, 588-3, 588-4, 588-5, 588-6, 588-7, 588-8 can notify a user that the number of neighboring event sensing devices each have their variable airflow devices activated.

The user interface 538 illustrated in FIG. 5D can notify a user of a confirmed fire via icon 596. Icons 598-1, 598-2, 598-3 can notify a user of a number of event sensing devices reporting a fire.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An event sensing device, comprising:
a variable airflow device; and
a controller configured to:
   activate the variable airflow device to increase airflow into the event sensing device responsive to a neighboring event sensing device detecting an unconfirmed fire;

detect whether a fire is occurring using the increased airflow responsive to activating the variable airflow device; and report a confirmed fire responsive to detecting the fire is occurring.

2. The device of claim 1, wherein the controller is configured to report a false alarm responsive to detecting the fire is not occurring.

3. The device of claim 1, wherein:

the device includes an optical scatter chamber; and the controller is configured to detect whether the fire is occurring by:

measuring a quantity of particles in the optical scatter chamber; and comparing the quantity of particles to a baseline quantity.

4. The device of claim 1, wherein the controller is configured to report the confirmed fire to an event detection system.

5. The device of claim 1, wherein the event sensing device and the neighboring event sensing device are located in a zone.

6. The device of claim 1, wherein the variable airflow device is a fan.

7. The device of claim 1, wherein the controller is configured to activate an event response logic responsive to detecting the fire is occurring.

8. A method of operating an event system, comprising:

receiving, by an event detection system, a report of an unconfirmed fire from a first event sensing device;

transmitting a command from the event detection system to a second event sensing device to activate a variable airflow device of the second event sensing device responsive to receiving the report of the unconfirmed fire, wherein the second event sensing device is a neighboring event sensing device of the first event sensing device; and indicating the second event sensing device is active on a display of the event detection system responsive to transmitting the command to the second event sensing device.

9. The method of claim 8, further comprising receiving, by the event detection system, a report from the second event sensing device that confirms the unconfirmed fire or designates the unconfirmed fire as a false alarm.

10. The method of claim 9, further comprising activating, by the event detection system, an event response logic responsive to the report confirming the unconfirmed fire or returning the event detection system to a normal state responsive to designating the unconfirmed fire as a false alarm.

11. The method of claim 8, further comprising measuring a quantity of particles in an optical scatter chamber of the second event sensing device, measuring a gas level in the second event sensing device, or measuring a temperature in the second event sensing device subsequent to activating the variable airflow device of the second event sensing device.

12. The method of claim 8, further comprising activating a variable airflow device of the first event sensing device responsive to the unconfirmed fire.

13. The method of claim 12, further comprising measuring a quantity of particles in an optical scatter chamber of the first event sensing device, measuring a gas level in the first event sensing device, or measuring a temperature in the first event sensing device subsequent to activating the variable airflow device of the first event sensing device.

14. A system, comprising:

a first event sensing device configured to:

measure a quantity of particles in an optical scatter chamber of the first event sensing device; and transmit a report of an unconfirmed fire based on the quantity of particles; and an event detection system configured to:

receive the report of the unconfirmed fire;

transmit a command to the first event sensing device to activate a variable airflow device of the first event sensing device responsive to receiving the report of the unconfirmed fire; and transmit a command to a second event sensing device to activate a variable airflow device of the second event sensing device responsive to receiving the report of the unconfirmed fire, wherein the second event sensing device is a neighboring event sensing device of the first event sensing device.

15. The system of claim 14, wherein the second event sensing device is configured to:

activate the variable airflow device responsive to receiving the command;

measure a quantity of particles in an optical scatter chamber of the second event sensing device, measure a gas level in the second event sensing device, or measure a temperature in the second event sensing device responsive to activating the variable airflow device;

compare the measured quantity of particles to a baseline quantity, the measured gas level to a baseline gas level, or the measured temperature to a baseline temperature; and transmit a report of a confirmed fire responsive to the measured quantity of particles being greater than the baseline quantity, the measured gas level being greater than the baseline gas level, or the measured temperature being greater than the baseline temperature.

16. The system of claim 15, wherein the event detection system is configured to receive the report of the confirmed fire.

17. The system of claim 16, wherein:

the system includes an output device; and the event detection system is configured to transmit a command to the output device to perform an output event responsive to receiving the report of the confirmed fire.

18. The system of claim 17, wherein the output device is a relay to an air vent, a sounder, a door closer, or a relay to an elevator.

19. The system of claim 17, wherein the output device is configured to:

perform the output event responsive to receiving the command from the event detection system; and transmit a notification that the output device performed the output event to the event detection system responsive to performing the output event.

20. The system of claim 15, wherein the system includes a computing device configured to receive the report of the confirmed fire.

* * * * *